Patented May 11, 1926.

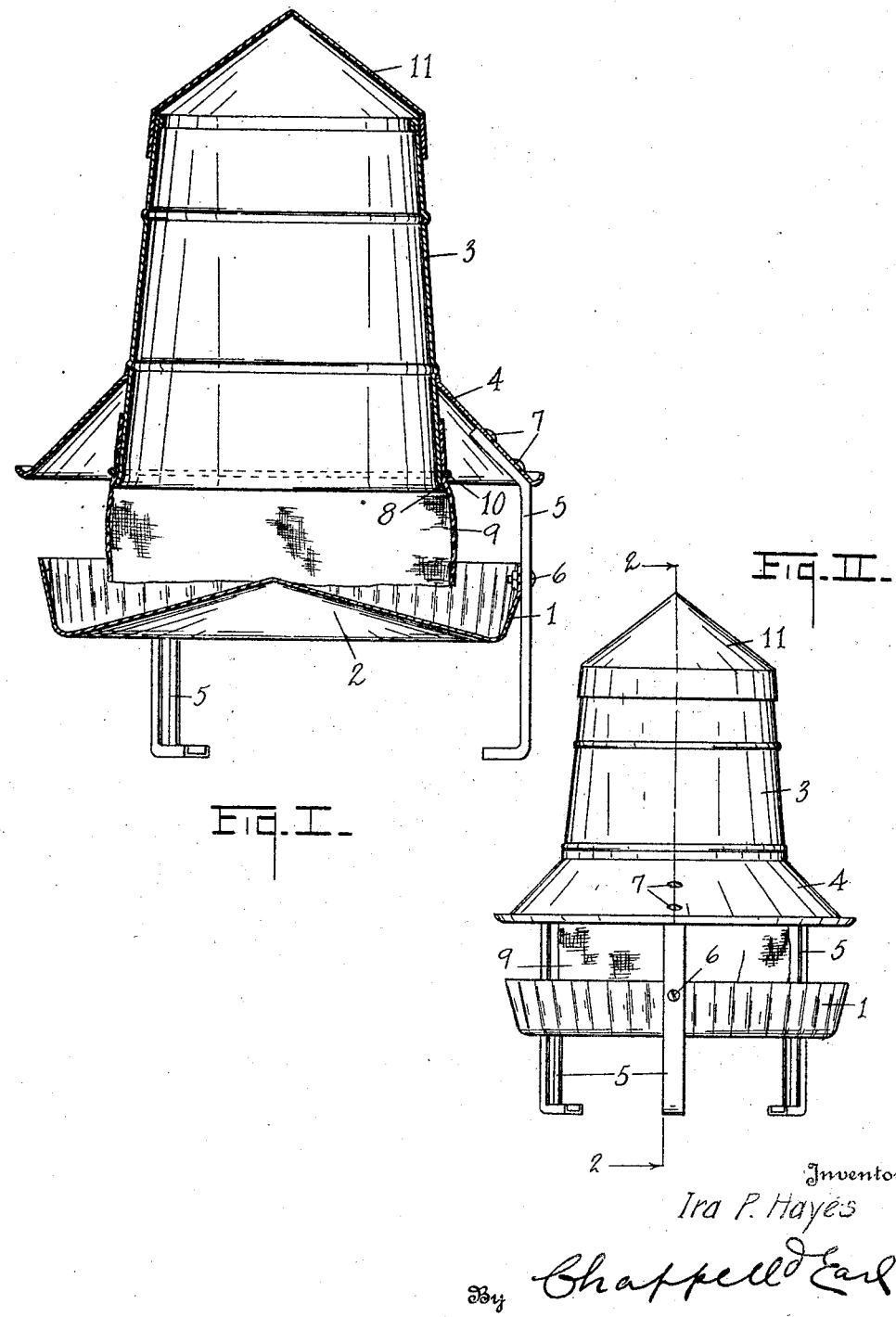

1,583,828

UNITED STATES PATENT OFFICE.

IRA P. HAYES, OF ECKFORD, MICHIGAN.

POULTRY FEEDER.

Application filed May 22, 1925. Serial No. 32,031.

This invention relates to improvements in poultry feeders.

The main objects of this invention are:

First, to provide an improved poultry feeder which is especially well adapted for feeding "dry" mash and one which is not likely to become clogged.

Second, to provide an improved poultry feeder which is sanitary and one which, while having a free discharge or delivery of feed, minimizes waste.

Objects relating to details and economies of construction and operation will definitely appear from the detailed description to follow.

I accomplish the objects of my invention by the devices and means described in the following specification. The invention is clearly defined and pointed out in the claims.

A structure which is a preferred embodiment of my invention is clearly illustrated in the accompanying drawing, forming a part of this application, in which:

Fig. I is a vertical section of my improved poultry feeder on a line corresponding to line 2—2 of Fig. II.

Fig. II is a side elevation.

In the drawing similar reference characters refer to similar parts throughout the several views.

Referring to the drawing, I provide a pan or trough 1 having tubular flaring sides and a conical bottom 2.

Above the bottom I support the hopper 3 which is preferably expanded as illustrated and has a bottom diameter substantially less than the diameter of the top of the pan.

The bottom of the hopper is supported in a plane substantially spaced from the plane of the upper edge of the pan. The lower end of the hopper is surrounded by a downwardly flaring guard or skirt 4 of such diameter as to overhang the pan, the lower edge of the skirt being approximately the lower edge of the hopper.

The pan and hopper are supported by the legs 5 which are secured to the pan as by means of the bolts 6 and to the guard as by means of the bolts or rivets 7.

The lower edge of the hopper is flared outwardly at 8. The flexible tubular hopper extension 9 embraces the lower end of the hopper and is adjustably secured thereto by the ring 10 which embraces the extension above the flange or flared portion 8.

The skirt is supported with its lower edge in spaced relation to the bottom of the pan. The cover 11 is conical so that fowls are not likely to roost thereon.

The flexible extension of the hopper provides a soft surface for the fowls to work around and under so that the fowls are not likely to injure themselves, and further, the extension is moved more or less by the feeding of the fowls so that the feed, such as mash or the like, is effectively worked down and prevented from packing or clogging within the hopper. The downward expansion of the hopper further facilitates this.

The guard 4 not only prevents the fowls from roosting an the edge of the pan but it guards it from the rain so that the feeder may be placed out of doors if desired.

I have not attempted to illustrate and described certain embodiments and adaptations which I contemplate as I believe this disclosure will enable those skilled in the art to embody or adapt my improvements as may be desired.

Having thus described my invention, what I claim as new and desire to secure by Letters Patent, is:

1. In a feeder, the combination of a pan, a hopper of a diameter less than that of the pan disposed with its lower edge substantially spaced from the pan, a downwardly flaring guard mounted on said hopper to overhang said pan and with its lower edge in spaced relation to the edge of the pan, legs secured to said pan and guard, and a flexible extension for said hopper depending freely into said pan.

2. In a feeder, the combination of a pan, a hopper disposed centrally of and with its lower edge in a plane substantially spaced from the plane of the top of the pan, a flexible tubular extension embracing said hopper, and a clamping ring embracing said extension whereby it is adjustably secured to said hopper.

3. In a feeder, the combination of a pan, a hopper of a diameter less than that of the pan disposed with its lower edge above the pan, and a flexible extension for said hopper adjustably secured thereto to depend into said pan.

4. In a feeder, the combination of a pan, a hopper disposed above said pan, and a flexible extension for said hopper depending freely into said pan.

In witness whereof I have hereunto set my hand.

IRA P. HAYES.